Figure 1:
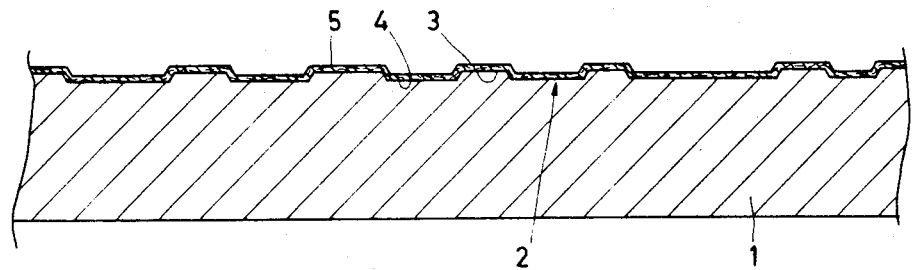

United States Patent [19]

Ponjee et al.

[11] Patent Number: 4,536,416
[45] Date of Patent: Aug. 20, 1985

[54] MATRIX AND METHOD OF MANUFACTURING ARTICLES OF A SYNTHETIC RESIN BY THE MATRIX

[75] Inventors: Johannes J. Ponjee; Frederik B. Melgert, both of Eindhoven, Netherlands

[73] Assignee: U.S. Philips Corporation, New York, N.Y.

[21] Appl. No.: 505,003

[22] Filed: Jun. 16, 1983

[30] Foreign Application Priority Data

Mar. 28, 1983 [NL] Netherlands ............... 8301070

[51] Int. Cl.³ .................................. B32B 3/02
[52] U.S. Cl. ......................... 427/131; 428/64
[58] Field of Search .............. 428/64, 432, 457; 106/38.22; 427/131

[56] References Cited

U.S. PATENT DOCUMENTS

| | | | |
|---|---|---|---|
| 2,888,354 | 5/1959 | Smith et al. | 106/38.22 |
| 3,498,800 | 3/1970 | Warner | 428/457 X |
| 3,861,951 | 1/1975 | Staniland et al. | 428/457 X |
| 3,914,519 | 10/1975 | Hall et al. | 428/457 |
| 4,188,434 | 2/1980 | Toran | 428/64 X |
| 4,239,828 | 12/1980 | Knope et al. | 428/64 |
| 4,272,574 | 6/1981 | Lippites et al. | 428/64 |

Primary Examiner—George F. Lesmes
Assistant Examiner—Nancy A. B. Swisher
Attorney, Agent, or Firm—Norman N. Spain

[57] ABSTRACT

A matrix having a surface which is manufactured from metal and which comprises a monolayer of an alkylmercaptan or a fluoroalkylmercaptan, as well as a method of manufacturing copies of synthetic resin from the matrix or copies comprising a coating layer of synthetic resin.

5 Claims, 3 Drawing Figures

MATRIX AND METHOD OF MANUFACTURING ARTICLES OF A SYNTHETIC RESIN BY THE MATRIX

The invention relates to a matrix which is suitable for the manufacture of copies of synthetic resin or copies comprising a coating layer of synthetic resin, in which the surface of the matrix, which during use contacts the synthetic resin, is manufactured from metal and comprises a release agent.

Such a matrix is known, for example, from U.S. Pat. No. 4,251,277. The release agent used in this known matrix is a polymer composition which comprises an organopolysiloxane as well as a thiofunctional polysiloxane liquid. The polymer composition is a clear liquid the kinematic viscosity of which is, for example, 75 to 100 cS ($75 \times 10^{-6}$ to $100 \times 10^{-6}$ m$^2$/s). As appears from the examples of the above mentioned U.S. Patent the release agent is provided in comparatively thick layers on a metal substrate, for example a metal panel. A layer thickness of 0.125 mm to 2.5 mm is preferably used. It is stated in column 7 from line 61 of this U.S. Patent that very small layer thicknesses of a few Ångstrom units may also be used. This apparently is based on a misconception. The molecule dimensions of the materials used are very much larger than the above mentioned few Ångstroms. The high viscosity also prohibits the provision of extremely thin layers. By using this known release agent, as well as when using many other known polysiloxane release agents, an SiO surface is provided on the metal surface of the substrate. Such an SiO surface shows some polarity as a result of which synthetic resins, for example the slightly polar synthetic resins, for example polyacrylates, polymethacrylates, polycarbonate, and the like, still show some interaction with said surface. It should be noted that the synthetic resins can be readily or fairly readily be released from such a modified surface. Nevertheless, as a result of the above-mentioned interaction, some synthetic resin material will remain on the matrix surface in the long run. This presents problems in reproduction processes in which large numbers of copies of synthetic resin have to manufactured from one matrix. Also problems occur when a matrix is used having a surface with a refined structure or texture, or with an ultrasmooth surface. The synthetic resin material remaining on the surface however little it may be, will haze the texture of the surface of the matrix as a result of which no further copies of good quality can be manufactured. As a result the matrix has to be replaced prematurely.

It is the object of the invention to provide a matrix which does not exhibit the above-mentioned disadvantages.

This object is achieved by means of a matrix of the type mentioned in the opening paragraph which is characterized in that a monolayer of an alkylmercaptan or a fluoroalkylmercaptan is used as a release agent.

The molecules of the alkylmercaptan or fluoroalkylmercaptan are fixed on the metal surface of the matrix and oriented so that the S-atoms of the compounds are bonded to the metal surface and the alkyl group or fluoroalkyl group extends from the metal surface outwardly. As a result of this the metal surface is provided with an immobile, quite inert surface of alkyl or fluoroalkyl. No polar groups or other reactive constituents are present in the resulting coating layer of alkyl or fluoroalkyl so that no second or subsequent layer can be provided in a bonding manner on the layer of alkylmercaptan or fluoroalkylmercaptan. The layer of alkylmercaptan or fluoroalkylmercaptan thus is a real monolayer the thickness of which corresponds to the size of the molecule. For example, when hexadecylmercaptan is used, the layer thickness is approximately 3 nm (16 C-atoms thick).

The monolayer of alkylmercaptan or fluoroalkylmercaptan is provided by first dissolving the mercaptan compound in a suitable organic solvent, for example chloroform. The concentration of the mercaptan compound in the solution preferably is small and is, for example, from 2-20 g per liter of solvent. The viscosity of the solution is low. For example, the kinematic viscosity is approximately 0.4 cS ($0.4 \times 10^{-6}$ m$^2$/s). The dynamic viscosity is then $6 \times 10^{-4}$ Pa.s. The matrix is dipped in the solution or the solution may also be sprayed or atomized on the matrix surface. The matrix or the surface of the matrix is then rinsed with the solvent so that residues of the solution and non-bonded alkylmercaptan or fluoroalkylmercaptan molecules are removed. Also as a result of the comparatively great mobility and the comparatively small molecular size of the mercaptan compounds used as compared with polymeric substances, the monolayer has a dense molecule packing so that the metal surface of the matrix is optimally modified and consequently screened.

In a preferred form of the matrix according to the invention an alkylmercaptan is used the alkyl group of which comprises at least 12 carbon atoms. As a rule the alkyl group will not comprise more than 20 carbon atoms. The term alkyl or alkyl group is to be understood to also include branched alkyl or a branched alkyl group. A very suitable compound is octadecylmercaptan. Other examples of compounds according to the invention are dodecylmercaptan and hexadecylmercaptan. Examples of a fluoroalkylmercaptan compound which as a rule comprise less than 12 carbon atoms are perfluoropentylmercaptan ($C_5F_{11}SH$) and perfluorooctylmercaptan ($C_8F_{17}SH$).

The metal matrix surface may be manufactured, for example, from Ni or Cu. Good results are achieved in particularly with a matrix surface of Ag.

A very interesting matrix in accordance with the invention is a matrix which is suitable for the manufacture of optically readable information discs of synthetic resin in which the surface of the matrix which during use is in contact with the synthetic resin, is manufactured from metal and comprises an optically readable information track of information areas situated alternately at a higher level and at a lower level, on which surface a monolayer of an alkylmercaptan or a fluoroalkylmercaptan is fixed.

These information areas have very small dimensions. The longitudinal dimensions vary in accordance with the stored information from, for example, 0.3 to 3 $\mu$m. The difference in height is 0.1 to 0.2 $\mu$m. An extremely smaller contamination of the surface of the matrix as a result of residues of synthetic resin has a disastrous influence on the quality of the information track. By using the above-described monolayer of alkylmercaptan or fluoroalkylmercaptan, the quality of the information track is not adversely influenced due to the small thickness of the layer. Moreover, the possibility of the above-mentioned contamination of the surface of the matrix is maintained so that a prolonged use of the matrix is possible.

The matrix is usually manufactured entirely from metal, for example Ni. If desired the surface of the matrix may first be provided with a layer of Ag and then with the monolayer of an alkylmercaptan or a fluoroalkylmercaptan. The matrix need not be entirely manufactured from metal but may comprise, for example, a synthetic resin plate or be provided with a synthetic resin layer, the surface of the synthetic resin layer or synthetic resin plate comprising, if desired, an information track, which layer or plate is covered with a layer of metal, in particular a layer of Ag, on which a monolayer of alkylmercaptan or fluoroalkylmercaptan is provided.

In a preferred form of the invention the matrix comprises a matrix member manufactured from glass or quartz, in which the surface of the member, which during use contacts the synthetic resin, is covered with a layer of metal on which a monolayer of an alkylmercaptan or fluoroalkylmercaptan is provided.

Such a matrix is suitable in particular for the production of optical components, for example lenses and mirrors, which are manufactured entirely from synthetic resin or which comprise a layer of synthetic resin in which the surface of the synthetic resin or layer of synthetic resin must be defined very accurately and, for example, is ultrasmooth. The matrix body is preferably manufactured from quartz. Quartz has a significantly more favourable temperature behaviour than metal so that, if high requirements are imposed upon the surface quality of the synthetic resin product to be produced, a ground quartz matrix is used. The metal layer used on the glass surface of the matrix according to the invention is preferably a monomolecular silver layer. Such a layer can be provided by treating the surface of the glass with $SnCl_2$ and then atomizing an ammoniacal silver salt solution over the surface thus sensitized. Silver atoms are deposited on the glass surface according to the reaction $Sn^{2+} + 2Ag^+ \rightarrow 2Ag + Sn^{4+}$.

The invention furthermore relates to a method of manufacturing articles of synthetic resin or comprising a coating layer of synthetic resin in which a liquid synthetic resin composition is provided on the surface of a matrix, if desired a supporting member is placed on the synthetic resin composition, the liquid synthetic resin composition is converted into a solid synthetic resin layer and the synthetic resin layer or in case of a supporting member the assembly of supporting member and attached resin layer, in which layer the matrix surface is copied, is removed from the matrix, which method is characterized in that a matrix is used which comprises a metal surface provided us with a monolayer of an alkylmercaptan or fluoroalkylmercaptan.

A suitable process is a compression process, an injection moulding process or a compression moulding process.

In an injection moulding process or a compression moulding process, a liquid plastic synthetic resin is compressed at elevated temperature and pressure in a mould which comprises one or more matrices. After removing the pressure and after cooling, a solid synthetic resin article is obtained the surface of which is a copy of that of the matrix. In a compression process no mould is used but the plastic synthetic resin flows at elevated temperature and pressure between the pressure plates of a press comprising a matrix.

Another process is a polymerization process with which copies of a cross-linked synthetic resin can be obtained. According to this process a liquid, heat- or light-curable monomer composition is provided on the surface of the matrix. If desired a supporting member may be provided on the layer, for example, a glass plate or preferably a plate of a transparent synthetic resin, for example, polymethylmethacrylate or polycarbonate. The layer of the monomer composition is cured, for example, by exposure to ultraviolet light. The cured layer or if a supporting member is present, the assembly of supporting member and cured layer attached thereto, in which layer the surface of the matrix is copied, is removed from the matrix surface. A suitable monomer composition comprises a mixture of acrylates and a photo-initiator, for example, an isobutylbenzoin ether.

The synthetic resin information discs are preferably manufactured by using the injection moulding process, compression moulding process of polymerization process.

Optical components from synthetic resin or comprising a coating layer of synthetic resin are preferably manufactured by means of the polymerization process.

In the manufacture of an optical component the matrix is provided, on the side of the monolayer of alkylmercaptan or fluoroalkylmercaptan, with a layer of, for example, a light-curable monomer composition. A supporting member, for example a glass lens, is provided thereon. The monomer composition is exposed to light, for example, via the matrix. (It is to be noted that the monolayer of Ag present on the matrix is sufficiently light-transparent.) After curing the monomers, the lens together with the cured synthetic resin layer bonded thereto the surface of which is a copy of that of the matrix, is removed from the matrix. In this manner a glass lens can be manufactured with a very accurately defined synthetic resin surface. The same applies to mirrors and other articles having a readily defined surface. It is expressly pointed out that the copy manufactured by means of the matrix according to the invention need not consist entirely of synthetic resin. It will suffice when at least that part of the copy which is in contact with the matrix surface consists of synthetic resin.

Figure 2:
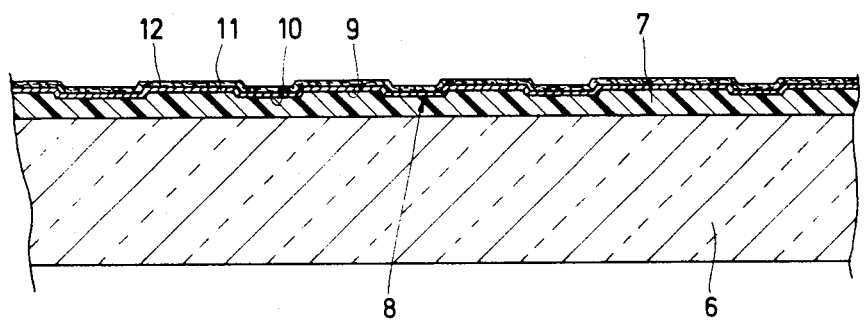
Figure 3:
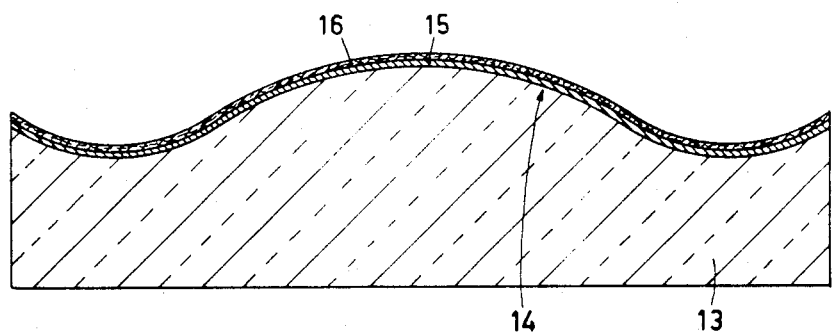

The invention will now be described in greater detail with reference to the drawing, in which FIG. 1 is a cross-sectional view of a matrix according to the invention, FIG. 2 is a cross-sectional view of another embodiment of the matrix and, FIG. 3 is a cross-sectional view of a further embodiment of the matrix.

Reference numeral 1 in FIG. 1 denotes a disc which is manufactured from Ni and which has on one side an optically readable information track 2. Track 2 has a crenellated profile of information areas 3 situated at a higher level alternated by information areas 4 situated at a lower level. These areas have very small dimensions, for example of $0.1\mu^2$. On the side of the information track the disc 1 is covered with a monolayer 5 of octadecylmercaptan. The layer thickness is approximately 3–4 nm. For clarity the layer thickness in the Figure has been drawn to be very much larger than it actually is.

Layer 5 is provided by dipping the disc in a solution of 7 g of octadecylmercaptan in 1 liter of chloroform for a few minutes. The disc is then rinsed with chloroform 5 times. After drying a monolayer of octadecylmercaptan is obtained the molecules of which are bound to the Ni-surface with their S-atom. The matrix may advantageously be used for the manufacture of replicas of synthetic resin, in particular of a plastic synthetic resin, for example polyacrylate, polymethacrylate, polycarbonate. An injection moulding process or impression moulding process is preferably used. The synthetic resin does not show any interaction with the surface of the matrix so that the release of the replicas occurs optimally.

Reference numeral 6 in FIG. 2 denotes a glass supporting plate which on one side has a layer of synthetic resin, for example, a positive photoresist layer 7. An optically readable information track 8 having information areas 9 and 10 situated alternately at a higher level and at a lower level is provided in the synthetic resin layer. The surface of the synthetic resin layer 7 is covered on the side of the information track 8 with a very thin silver layer 11 having a thickness of 0.5 nm and then with a monolayer 12 of a hexadecylmercaptan. The monolayer 12 has a thickness of approximately 3 nm. Monolayer 12 is provided in a manner as described with reference to FIG. 1. Synthetic resin replicas of the matrix can be manufactured, preferably by using the above-described polymerization process. For this purpose, a layer of a light-curable lacquer on the basis of acrylates is provided on the monolayer 12. A supporting plate of, for example, glass or a transparent synthetic resin is placed on the lacquer layer. The lacquer layer is exposed via the supporting plate and the resulting replica which consists of the supporting plate and the cured lacquer layer which is bonded thereto and in which the surface of the matrix is copied is removed from the matrix surface. There is no interaction between the matrix surface and the cured lacquer layer so that the replica can be released optimally from the matrix.

Reference numeral 13 in FIG. 3 denotes a body which is manufactured from quartz and which has an ultrasmooth polished surface having an optical profile 14 (Schmidt-corrector profile). The body 13 on the side of profile 14 comprises a monolayer 15 of silver. On silver monolayer 15 a monolayer 16 of hexadecylmercaptan is provided in a manner as described with reference to FIG. 1. Synthetic resin replicas of the resulting matrix can be made, preferably by using the polymerization process. A light-curable liquid lacquer is provided on monolayer 16 and a supporting member is placed hereon. The supporting member is manufactured, for example, from glass and has a profile which is approximately the negative of profile 14. The lacquer layer is exposed to light via the supporting member or via the matrix. The supporting member with the cured lacquer layer bonded thereto is removed from the matrix surface. In this manner a replica is manufactured the surface of which which consists of cured synthetic resin is an exact copy of that of the matrix.

What is claimed is:

1. A method of improving the removability of a body comprising a pattern-bearing synthetic resin surface from a matrix comprising a metal surface bearing the negative of said pattern and contacting said synthetic resin surface during formation of said pattern on said synthetic resin surface, said method comprising coating said metal surface with a monolayer of a releasing agent selected from the group consisting of alkylmercaptans and fluoroalkylmercaptans prior to contacting said metal surface with said synthetic resin surface.

2. The method of claim 1 wherein releasing agent is an alkylmercaptan in which the alkyl is of at least 12 carbon atoms.

3. The method of claim 2 wherein the alkylmercaptan is octadecylmercaptan.

4. The method of claim 1 wherein the matrix is adapted to the manufacture of optically readable synthetic resin information discs and said surface comprises an optically readable information track comprising information areas situated at alternating higher and lower levels.

5. The method of claim 1 wherein the matrix is manufactured from glass or quartz and said surface is a metal layer deposited on said glass or quartz.

* * * * *